UNITED STATES PATENT OFFICE

MELVIN DE GROOTE, OF ST. LOUIS, LOUIS T. MONSON, OF MAPLEWOOD, AND EDWARD H. KEISER, OF CLAYTON, MISSOURI, ASSIGNORS, BY MESNE ASSIGNMENTS, TO TRETO-LITE COMPANY, OF WEBSTER GROVES, MISSOURI, A CORPORATION OF MISSOURI

PROCESS FOR BREAKING PETROLEUM EMULSIONS

No Drawing.      Application filed March 3, 1930. Serial No. 432,973.

This invention relates to the treatment of emulsions of mineral oil and water, such as petroleum emulsions, for the purpose of separating the oil from the water.

Petroleum emulsions are usually of the water-in-oil type, and comprise fine droplets of naturally-occurring waters or brines dispersed in a more or less permanent state throughout the oil, which constitutes the continuous phase of the emulsion. They are obtained from producing wells and from the bottoms of oil-storage tanks, and are commonly referred to as "cut oil", "roily oil", "emulsified oil", and "bottom settlings".

The object of our invention is to provide a novel and economical process for separating emulsions of the character above referred to into their component parts of oil and water or brine.

Briefly described, our process consists in subjecting a petroleum emulsion of the water-in-oil type to the action of a treating agent or demulsifying agent that comprises, contains or consists of an acetylated derivative of a hydroxylated fatty acid, thereby causing the emulsion to break down and separate into its component parts of oil and water or brine, when the emulsion is permitted to remain in a quiescent state after treatment.

The treating agent or demulsifying agent contemplated by our process may be derived from various hydroxylated fatty acids, and may be produced or obtained in various ways. Examples of acetylated derivatives of hydroxylated acids suitable for use in our process are acetylated ricinoleic acid, acetylated polyricinoleic acid, acetylated castor oil, and acetylated sulforicinoleic acid. In producing or obtaining such derivatives we may employ the naturally-occurring acids of the mono-hydroxylated type, such as sadinic and lanopalmitic acid, or of the dihydroxylated type, such as lanoceric and dihydroxystearic acid, or we may employ synthetic hydroxlated acids, such as ricinelaidic acid. The following substances may also be employed, i. e., dihydroxystearic acid prepared by the action of alkaline potassium permanganate on oleic acid, or by the sulfonation, and subsequent washing with water, of castor oil or ricinoleic acid; hydroxystearic acid prepared, for example, by sulfonating oleic acid, washing, and subsequently boiling the oily product with water; and hydoxy acids prepared in a similar manner from linseed oil, corn oil, cottonseed oil, or other unsaturated oils or from fatty acids.

If desired, sulfonation of the acetylated hydroxy acid may be resorted to in order to enhance the desirable characteristics of the material. The hydroxy fatty acid may be sulfonated first and subsequently acetylated or sulfonation and acetylation may be allowed to take place simultaneously. In all cases when sulfonation and acetylation are allowed to take place, the product contains organically bound sulfur and a hydrolyzable acetyl group. The identification of the organically bound sulfur or of the hydrolyzable acetyl group will serve to identify the treating agent. For example, by combustion in a sodium peroxide bomb and subsequent precipitation of barium sulfate, the total sulfur present may be determined. The free sulfuric acid or sulfates may be determined by shaking an ethereal solution of the material with saturated sodium chloride solution and precipitating the "free sulfur" as barium sulfate. The difference between the two values so obtained represents organically bound sulfur.

The presence of an acetylated hydroxy fatty acid may be proved by saponifying a sample, containing no free acetic acid, with alcoholic potash, acidifying with sulfuric acid, and distilling the liberated acetic acid, as in the conventional method for determining hydroxyl groups in fatty acids.

A treating agent or demulsifying agent of the kind above described may be produced or obtained by refluxing a hydroxylated fatty acid or a derivative thereof with an excess of acetic anhydride, acetyl chloride, or other acetylating agent, until acetylation (replacement of the hydroxyl group by the acetyl group) is as complete as desired. If a sulfonated derivative of an acetylated hydroxy fatty acid is desired, the acetylated mass may be subjected to the action of sulfuric acid, oleum, chlorosulfonic acid, or other suitable sulfonating agent, as is common practice in the textile oil industry. Sulfonation may also precede acetylation, or the two processes may be conducted simultaneously by adding, for example, acetic anhydride or acetyl chloride to the hydroxylated fatty body, and then adding the desired amount of sulfuric acid, oleum, chlorosulfonic acid or other suitable sulfonating agent.

One procedure that may be employed to produce a treating agent suitable for use in our process is as follows:

400 lbs. of castor oil; and 200 lbs. of acetic anhydride refluxed together for four hours. At the end of this time the mixture is allowed to cool to room temperature. It is then sulfonated by running into it 200 lbs. of 66° Baumé sulfuric acid and continuously agitating the mass during the addition of acid to the reacted mixture of castor oil and acetic anhydride. The said reaction mass is allowed to stand 24 hours, after which it is washed with water or with sodium sulfate solution to remove the excess of mineral and acetic acids.

The material obtained by the above procedure contains a relatively high percentage of acetyl sulforicinoleic acid and it may be used in our process either in the acid state or in a neutralized state. If used in a neutralized state it may be wholly or partially neutralized with caustic soda, sodium carbonate, caustic potash, ammonium hydroxide, or any other suitable basic material. We prefer to neutralize said material prior to using said material to treat the emulsion, inasmuch as the use of acid material to treat petroleum emulsions is undesirable, due to its corrosive action on pipe lines, tanks or other containers commonly used to store or handle petroleum. The acidic material above described may also be esterified by using any of the usual means for producing aromatic or aliphatic esters. Some of these esters may be oil-soluble, such as the hexyl ester.

One of the principal products or compounds of the above reaction may be represented by the following formula:

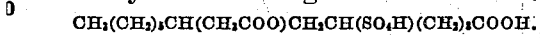

CH₃(CH₂)₅CH(CH₃COO)CH₂CH(SO₄H)(CH₂)₇COOH.

This compound, acetyl sulforicinoleic acid, is present in the reaction mass when either ricinoleic acid or castor oil is acetylated and sulfonated. When acetylated, the OH group of the hydroxy-acid is replaced by the CH₃COO group. Sulfonation causes the addition at the double bond of the elements of sulfuric acid with the formation of an acid sulfuric ester of the same general class as ethyl sulfuric or sulfovinic acid, i. e., an alkyl sulfuric ester. Boiling this compound with water or dilute hydrochloric acid will hydrolyze the sulfuric acid group, after which the latter may be determined by means of barium chloride. Saponification by means of alcoholic potash will hydrolyze the acetyl group, with the formation of potassium acetate. On adding sulfuric acid, the acetic acid which is liberated thereby may be distilled and estimated.

A material of the kind described above may be used in an anhydrous state, or in solutions of any desired strength to constitute the demulsifying agent or treating agent of our process. Said material can be used alone to form the demulsifying agent, or it can be combined with other well known treating agents for petroleum emulsions of the water-in-oil type, such as water softeners, modified fatty acids or their salts, petroleum sulfonic acids, sulfonated alkylated aromatics, or other substances having similar characteristics.

In practising our process a treating agent or demulsifying agent of the kind above described is brought in contact with the emulsion to be treated in any of the numerous ways now employed in the treatment of petroleum emulsions of the water-in-oil type with chemical demulsifying agents, such as, for example, by introducing said agent into the well in which the emulsion is produced; introducing said agent into a conduit through which the emulsion is flowing; introducing said agent into a tank in which the emulsion is stored; or introducing said agent into a container that holds a sludge obtained from the bottom of an oil storage tank. In some instances it may be advisable to introduce the treating agent into a producing well in such a way that it will become mixed with water and oil that are emerging from the surrounding strata before said water and oil enter the barrel of the well pump or the tubing up through which said water and oil flow to the surface of the ground. After treatment the emulsion is allowed to stand in a quiescent state, usually in a settling tank, at a temperature varying from atmospheric temperature to about 200° F., so as to permit the water or brine to separate from the oil, it being preferable to keep the temperature low enough to prevent the valuable constituents of the oil from volatizing. If desired, the treated emulsion may be acted upon by one or the other of various kinds of apparatus now used in the operation of breaking petroleum emulsions, such as homogenizers, hay tanks, gun barrels, filters, centrifuges, or electrical dehydrators.

The amount of treating agent required to break the emulsion may vary from approximately 1 part of treating agent to 500 parts of emulsion, up to a ratio of 1 part of treating agent to 20,000 parts of emulsion, depending upon the type or kind of emulsion being treated. In treating exceptionally refractory emulsions of the kind commonly referred to as "tank bottoms" or "residual pit oils", the minimum ratio above referred to is often necessary, but in treating fresh emulsions, i. e., emulsions that will yield readily to the action of chemical demulsifying agents, the maximum ratio above mentioned will frequently produce highly satisfactory results.

For the average petroleum emulsion of the water-in-oil type a ratio of 1 part of treating agent to 5,000 parts of emulsion will usually be found to produce commercially satisfactory results.

Having thus described our invention, what we claim as new and desire to secure by Letters Patent is:

1. A process for breaking a petroleum emulsion of the water-in-oil type, which consists in subjecting the emulsion to the action of a demulsifying agent containing an acetylated derivative of a hydroxylated fatty acid.

2. A process for breaking a petroleum emulsion of the water-in-oil type, which consists in subjecting the emulsion to the action of a demulsifying agent containing a water-soluble acetylated derivative of a hydroxylated fatty acid.

3. A process for breaking a petroleum emulsion of the water-in-oil type, which consists in subjecting the emulsion to the action of a demulsifying agent containing an ammonium salt of an acetylated derivative of a hydroxylated fatty acid.

4. A process for breaking a petroleum emulsion of the water-in-oil type, which consists in subjecting the emulsion to the action of a demulsifying agent containing an acetylated derivative of castor oil.

5. A process for breaking a petroleum emulsion of the water-in-oil type, which consists in subjecting the emulsion to the action of a demulsifying agent containing a water-soluble acetylated derivative of castor oil.

6. A process for breaking a petroleum emulsion of the water-in-oil type, which consists in subjecting the emulsion to the action of a demulsifying agent containing an ammonium salt of an acetylated derivative of castor oil.

7. A process for breaking a petroleum emulsion of the water-in-oil type, which consists in subjecting the emulsion to the action of a demulsifying agent that contains an acetylated sulfur-containing derivative of castor oil.

8. A process for breaking a petroleum emulsion of the water-in-oil type, which consists in subjecting the emulsion to the action of a demulsifying agent that contains a water-soluble acetylated sulfur-containing derivative of castor oil.

9. A process for breaking a petroleum emulsion of the water-in-oil type, which consists in subjecting the emulsion to the action of a demulsifying agent that contains an ammonium salt of an acetylated sulfur-containing derivative of castor oil.

10. A process for breaking a petroleum emulsion of the water-in-oil type, which consists in subjecting the emulsion to the action of a demulsifying agent containing acetyl sulforicinoleic acid.

MELVIN DE GROOTE.
LOUIS T. MONSON.
EDWARD H. KEISER.